United States Patent Office 3,015,640
Patented Jan. 2, 1962

3,015,640
PROCESS OF MAKING A PLASTICIZED VINYL RESIN AND PROCESS OF MAKING A SURFACE COVERING THEREFROM
John B. Weaver, Lancaster, Pa., and Robert K. Petry, Mountain Lakes, N.J., assignors to Congoleum-Nairn Inc., Kearny, N.J., a corporation of New York
No Drawing. Filed Dec. 15, 1960, Ser. No. 75,934
26 Claims. (Cl. 260—26)

This invention relates to composition for use in producing flexible, composition surface coverings and particularly to a plasticized, thermoplastic synthetic resinous binder, and to an improved process for preparing such products. This application is a continuation-in-part of our copending application Serial No. 602,888 filed August 8, 1956, now abandoned, entitled Process for Producing Plastic Surface Covering.

In accordance with present commercial practice, plastic surface coverings are composed of plasticized, thermoplastic synthetic resinous binders, pigments, stabilizers, fillers and the like. They are prepared in sheet or tile form and widely used as coverings for floors, walls, vehicle interiors and the like. They range in thickness from about 0.020 inch to about 0.125 inch and are often prepared on backings of impregnated felt or other material.

Vinyl resins are most generally employed as the primary film forming ingredient of the binder of plastic surface coverings. Polyvinyl chloride and its copolymers, particularly polyvinyl chloride copolymerized with vinyl acetate, are used in the greatest quantities. Plasticizers are normally added to improve the flexibility of the composition. Conventionally, this is accomplished by mixing all of the ingredients of the surface covering composition under conditions of high heat and pressure in a device such as a Banbury mixer. In this manner the thermoplastic resin is plasticized by the plasticizer and well mixed with the fillers, pigments and stabilizers. The heat causes the thermoplastic resin to become soft and tacky, and, thus, in conjunction with the effect of the plasticizer, it is able to function as a binder for the entire composition during processing. After mixing, the composition is sheeted by passing it through calender rolls operating at the softening temperatures of the composition which is usually of the order of 200 to 375° F. A plain colored sheet is obtained in this manner, which, after cooling, is suitable for use as a surface covering.

Most products of the type with which the invention is concerned are intended to be multicolored and therefore more decorative and pleasing to the eye. Multicolored sheets are obtained by comminuting a number of differently colored plain sheets and mixing the discrete particles so obtained in the desired relative color proportion. The mixture is then heated and consolidated by calendering at the aforementioned elevated temperatures. In this manner a variegated, streaked appearance, known as "Jaspe," is obtained in the resulting sheet due to the elongation and mixing of the particles in the course of calendering. A typical method of forming a sheet having a marbleized appearance is effected in accordance with the so-called cross-calendering technique. By this method Jaspe sheets are cut at intervals, turned 90°, placed in overlapping relationship and fed to a second calender operation. Sheets prepared in this manner are usually passed through finishing rolls to smooth and polish the surface of the sheet. Conventionally one of the rolls is highly polished steel or chrome while the other is composed of resilient material, such as rubber. The sheets can be cut into tiles if desired prior to distribution.

Heretofore, repeating decorations other than "Jaspe" or marble have been impossible to obtain by means of continuous calendering equipment. Different decorations are obtained by applying a multi-colored mixture of particles onto a backing and pressing such particles under conditions of high heat and pressure to form a unitary sheet. These decorations are of a non-repeating, random type, a decoration simulating terrazzo being typical thereof.

Standard linoleum equipment is not suitable for handling plastic surface covering compositions as it is intended to function at temperatures below about 225° F. Thus, it has not been possible to direct sheets of plastic surface coverings to conventional straight-line linoleum inlaying machines and obtain the geometric type designs associated with linoleum. These machines function by continuously receiving several sheets of uncured linoleum composition and cutting various shapes from such sheets for automatic assembly onto a web into a prearranged design. Each sheet may be of a different color and/or decoration and once the design is assembled, it is consolidated and affixed to the backing by passage of the entire assembly through a rotary press at temperatures of the order of 225° F. The device normally used to make the cut-outs from the linoleum sheets is not suitable for use in connection with sheets of plastic composition. Moreover, no satisfactory economical replacement for the cutting devices has been found. Even if the cut-outs could be made, they could not be assembled into a unitary sheet because of the low operating temperatures of the conventional linoleum inlaying machine and other equipment associated therewith. It is not practical to devise new forms and types of inlaying machines because of their great cost and the large amount of space they occupy.

A general object of the invention is to provide a thermoplastic resinous composition which can be formed into sheets or other objects at low temperatures and subsequently converted by the application of heat into a finished product having the properties of a fused and solvated composition. Another object is to produce such a composition which has a high proportion of filler. Other objects and the advantages of the invention will appear hereafter.

It has now been discovered that the above and other objects can be achieved in a composition by plasticizing and fusing the resinous binder thereof in a stepwise manner in the course of processing. It has been found that the principal portion of the resins which make up the binder can be carried through initial processing in an unplasticized and unfused state by a composition containing resin, plasticizer and a small portion of plasticized and fused resin. Such a composition, with the principal portion of the resinous binder unplasticized and dispersed therethrough can be sheeted, or molded, or coated on a base at temperatures below those which will cause the principal portion of the resins to become plasticized and fused. Such a composition when formed into a sheet is strong enough to hold together during passage through a straight-line linoleum inlaying machine, yet soft enough for the dies of the machine to make appropriate cut-outs and be consolidated and welded at low temperature. It has been further discovered that the principal portion of the resinous binder can be plasticized and fused after a sheeting or an inlaying operation by elevating the temperature of the sheet to that normally required to plasticize and fuse the resin. This may be accomplished without affecting the decoration of the sheet and provides a product ready for finishing and distribution.

Heretofore it has not been possible to plasticize or fuse a plastic composition containing a large amount of filler in a stepwise manner. It has been suggested to use gelling aids such as metallic soaps or bentone clays to convert liquid plastisols (dispersion of resin in liquid plasticizer) to a solid "plastigel." These gelling aids do not substantially increase the tensile strength of the material but reduce the mobility of the plasticizer and produce a highly thixotropic vinyl product which can be processed by extrusion or molding in an unplasticized condition and retain its physical shape during fusion or plasticization at elevated temperatures.

The addition of fillers reduces the strength of the gel structure by absorption of the available plasticizer on the surface of the filler particles. Furthermore the addition of substantial quantities of filler to a plastisol increases the tensile strength requirements necessary for processing in a solid state. The amount of filler which a soap or bentone gelled plastisol can tolerate depends largely upon the oil absorption value of the fillers added, but for common fillers such as ground limestone, talc gypsum, etc., the addition of about 20% to 25% of filler increases tensile strength requirements for solid state processing beyond that which the above-mentioned gelling aids will provide.

As indicated heretofore the resin portion of the binder is plasticized and fused in a stepwise manner. The principal portion of the resinous binder is carried throughout the process, until the last steps in an unplasticized and unfused condition and as small discrete particles distributed throughout the remainder of the composition. The composition maintains cohesiveness by that portion of the resinous binder which is plasticized and fused in the course of initial mixing. For convenience, the portion of the total resinous binder which is plasticized and fused in the initial stage is referred to as the "processing binder" and the portion of the total resinous binder which is plasticized and fused in the final stage is referred to as the "principal binder." Both of these materials, when fused, function as the entire binder for the product. It is to be understood that the term resinous binder does not necessarily denote the use of only one resinous material but can be a mixture of various resinous materials.

PRINCIPAL BINDER

The physical characteristics of the final product are attributable primarily to those properties contributed by the principal binder. As aforementioned, the resins most widely used in this connection are polymers of vinyl chloride. Suitable polymers include polyvinyl chloride, copolymers of vinyl chloride and vinyl acetate which have specific viscosities above about 0.17 as measured in a solution containing 0.20 gram of resin per 100 milliliters of nitrobenzene at 20.0° C. and containing vinyl chloride in the range of about 90% to 97% by weight, as well as copolymers of vinyl chloride and dibutyl maleate, ethyl acrylate, methyl acrylate, butyl acrylate, methyl methacrylate, and butyl methacrylate, all containing substantially the same amount of combined vinyl chloride and having the same viscosity are particularly useful. In addition, copolymers of vinyl chloride and acrylonitrile containing 45% to 80% vinyl chloride can be used, as well as certain copolymers of vinyl chloride and vinylidene chloride. All of the resins mentioned hereinabove can be characterized as vinyl resins which are substantially insoluble in toluene at 25° C. In other words, toluene in the ratio of ten parts of toluene to one part of resin extracts a fraction amounting to no more than 15% of the entire resin. The resin can, however, be any finely divided thermoplastic resin which requires fusion by solvation by a plasticizer for film formation provided such plasticization annd fusion can be prevented at least 100° F. below the temperature at which it is effected. The preferred vinyl resins are the polymers of vinyl chloride polymerized to a high degree as indicated by a specific viscosity of from about 0.17 to 0.31 determined by dissolving a 0.20 gram sample of resin in 100 milliliters of nitrobenzene at 20°±5° C.

In order to function in the process of the invention, the principal binder cannot be present as a film in the course of processing the surface covering composition until the final stages thereof. Normally, film formation is effected by plasticizing and fusing the resin of the binder and therefore an important feature of the invention relates to processing the principal binder as discrete particles in the presence of a plasticizer therefor without effecting plasticization and fusion of the particles. In this connection the relatively low processing temperature employed is important. Best results are obtained, however, by complementing the retardation of plasticization at low temperature by the selection of a resin which is difficult to plasticize. Such resins are commercially available and are called "dispersion grade" resins. Generally, they are of smaller particle size than ordinary resins. For example, conventional polyvinyl chloride homopolymer and copolymer resins are often prepared as particles having a diameter ranging from about 5 to about 35 microns. Particles of dispersion grade resins have a diameter ranging from about 0.02 to about 2.0 microns. Dispersion grade resins are usually of a higher molecular weight than other resins. The finer particles are particularly advantageous because they can be readily distributed throughout the composition thereby insuring a homogeneous final product.

While plasticization and fusion of ordinary vinyl resins cannot be completely effected at temperatures below about 340° F. absorption of the plasticizer can occur at temperatures of the order of 200° F. or even 120° F. if the contact time is long enough which would cause premature stiffness of the mass. The stiffening of the resin within a composition, caused by plasticizer absorption by the resin particles, is undesirable from the point of view of obtaining smooth, cohesive sheets of the composition under the conditions normally used for processing compositions.

The total binder content of compositions prepared according to the invention covering including plasticizers, can range from about 20 to about 100% of the composition and preferably from 40 to 70%. Excellent results have been obtained with about 40 to 50% binder. This can be comprised of a large amount of the principal binder although a small portion can be composed of so-called "extenders" which tend to reduce strength and decrease flexibility. It is the common practice of some manufacturers to employ from 10 to 20% of materials such as coumarone-indene resins, petroleum resins, chlorinated paraffins, rosin derivatives and the like for this purpose. The total binder includes plasticizers and the processing binnder in amounts within the limits set forth hereinafter.

PROCESSING BINDER

The principal binder and the processing binder together constitute the entire resinous binder for the finished product. Thus the processing binder must be a material which is compatible with the principal binder, that is, it must become an integral part of the film which holds the ingredients of the finished sheet together. Consequently, the processing binder must at least be soluble in the plasticizer which ultimately plasticizes the principal binder. In order to function as a binder of any sort the processing binder must form a film when dissolved in plasticizer and in addition it must transform the free or available plasticizer employed in the composition from its normally liquid state to a state capable of holding together during processing.

It has been found that film formers such as thermoplastic or rubbery elastomers meet the requirements set forth above and can be used in the invention. Such materials include low molecular weight polymers of vinyl chloride such as polyvinyl chloride, vinyl chloride copolymerized with vinyl acetate, synthetic rubbers such as butadiene elastomers as, for example, butadiene-acrylonitrile and butadiene-styrene, a copolymer of isobutylene and isoprene, and polymerized chloroprene. These resins are high melting point rubber-like resins having a high viscosity (above 40 by Mooney) which will maintain a high viscosity in the presence of the total plasticizer required and are capable of forming a flexible film at temperatures below the point where the principal binder becomes plasticized and fused. A processing binder which will fulfill all the requirements of the invention will substantially increase the tensile strength of the composition before plasticization of the principal binder and will not substantially decrease the tensile strength of the composition after fusion over a similar composition minus such binder. The synthetic rubbers are particularly effective since they will produce a product prior to solvation of the dispersed resin having high tensile strength which enables the use of large amounts of fillers.

A simple test, as follows, can be employed in order to select a satisfactory processing binder: prepare about two parts of a suitable plasticizer as proposed for use in the invention. Add about one part of the proposed processing binder to the plasticizer to make a homogeneous solution. If it does form a homogeneous solution, spread a thin layer of the solution onto a glass plate and observe whether or not a film is formed as distinguished from an assembly of non-cohesive or slightly cohesive particles. Thereafter add about four parts of the principal binder to the remainder of the solution and increase the temperature of the composition to a point sufficient to solvate the principal binder (300° F. to 350° F. in the case of polyvinyl chloride). Thereafter cast a film of the principal binder and plasticizer on a glass plate and effect fusion thereof by elevating the temperature. Next determine if the film containing the processing binder as formed has a tensile strength appreciably below that obtained from the other film constituted only of the principal binder used. Standard tensile strength meters can be employed but are unnecessary as a small amount of an unsatisfactory processing binder will decrease the high tensile strength of the principal binder to a point where instruments are not required to determine the difference. Materials of this sort indicate pronounced differences in tensile strength when cast as a film with a material with which they are not compatible. A material meeting all the requirements of the test outlined above is useful in the invention as a processing binder. Best results have been obtained with a high molecular weight copolymer of butadiene and acrylonitrile and similar rubbery polymers from the standpoint of ease of handling a composition prepared therewith and in regard to overall final product characteristics.

Only relatively small amounts of processing binder need or should be used in the invention although the specific amount selected depends on the particular processing binder employed and the final product characteristics desired. Generally, if the binder comprises more than about 30% of the processing binder a surface covering prepared therefrom loses tensile strength and flexibility. Most often it is desirable to use as little as possible. Amounts as low as 2% of the total composition can be used in certain formulations, particularly those which require sheeting only for the purpose of subsequent comminution and pressing instead of further calendering. The best results have most frequently been obtained with from about 5 to about 20% by weight based on the weight of the total binder excluding plasticizer.

PLASTICIZER

Most all of the conventional plasticizers presently employed in the plastic surface covering art can be used in the invention. The plasticizer functions to dissolve or solvate the binder ingredients and make possible the formation of a film which serves as a matrix for the fillers, pigments, stabilizers, etc. As aforementioned, conventional practice requires initial plasticization of the entire binder and subsequent working is conducted on a composition containing a thermoplastic film. In the present invention there must be sufficient plasticizer to achieve the desired characteristics of the total binder in the final product yet the interaction between the plasticizer and the principal binder must be delayed until the last stages of processing. Thus the interaction of the plasticizer and the processing binder must be such as to make it possible to carry the normally liquid plasticizer through initial processing. It has been discovered that this can be accomplished with conventional plasticizers by the addition thereto of the relatively small amounts of processing binder employed in the invention. By such addition the plasticizer becomes a soft mass which has good tack or binding power; however, the mass is able to function as a binder during processing while it remains capable of solvating the principal binder when required.

The plasticizer must have a low vapor pressure at the high temperatures of fusing the principal binder. It has been found that vapor pressure at 400° F. below about 2 mm. gives very satisfactory results. Aliphatic ester plasticizers therefore such as dimethyl phthalate, dibutyl phthalates, dicapryl phthalate, dioctyl phthalate, dibutyl sebacate, dioctyl sebacate, dibutoxy ethyl phthalate, dibutoxyglycol phthalate, trioctyl phosphate, octyl-decyl adipate, triethylene glycol di-2-ethylbutyrate and the like and combinations thereof have been used successfully. Low molecular weight polymeric materials such as adipic or sebacic acid polyesters and the like can also be used.

Secondary plasticizers, which are less compatible with the principal binder, can be used in combination with the primary or solvent type plasticizers described above. The quantity of secondary plasticizer used is limited by its degree of compatibility with the principal binder and the primary plasticizer used. Examples of suitable secondary plasticizers are alkyd derivatives of rosin, phenoxyethyl oleates and laurates, chlorinated paraffine, aromatic hydrocarbon condensates and the like. Best results have been obtained with a blend of plasticizers consisting of from about 15% to about 35% of a secondary type plasticizer such as an alkyd derivative of rosin or phenoxyethyl oleate and from about 85% to about 65% of primary plasticizer such as dioctyl phthalate. Such mixtures have relatively low solvating rates on the principal binder at temperatures below 200° F. Although their solvation rate may be as low as one-fourth that of other plasticizers or combinations, they do not substantially retard the rate of solvation of the principal binder at temperatures above 350° F.

The plasticizer can comprise from about 20 to about 50% by weight of the total binder, and it is preferred to use from about 25% to about 35%. The precise amount selected is determined by the final product characteristics desired, for example, the degree of stiffness required; and the amount needed to plasticize all of the binder ingredients requiring plasticization. As a general rule, the plasticizer is used within the range of about 40 to 150 parts by weight to 100 parts of resin.

FILLER

The term "filler" as used herein is intended to relate to all of the non-binder ingredients normally employed in resinous compositions. Conventionally such materials include inert materials as limestone, clay, talc, asbestos, fiber, wood flour and the like of relatively small particle size, say 80 mesh and finer; stabilizers to diminish degradation effects of light and heat; pigments; and the like. Pigments can comprise up to about 15% of the total composition, stabilizers up to 5% and the total filler content can be as high as about 80%. The conventional amount of filler is from 30 to 60% of the composition.

One of the features of the invention is the discovery that highly filled products (containing over 25% filler), such as surface coverings, can be processed in a stepwise manner because of the processing binder of the invention. The composition is even more highly filled, than is immediately apparent as the unplasticized principal binder is present until fusion as a filler for all practical purposes. All of the filler need not be added at the time of mixing with the processing binder but part or the remaining portion can be added with the principal binder.

PROCESSING

The product of the invention is best prepared under carefully controlled conditions. To minimize premature interaction of the plasticizer on the principal binder, the severe mixing which is required in connection with the processing binder, the plasticizer and the fillers is conducted in the absence of the principal binder and thereafter cooled. Thus when utilizing the preferred binders, it is unnecessary to exercise any severe limitations with respect to this mixing operation which can be conducted at any temperature up to about 350° F. A mixing temperature range of 120° C. to 160° C. is conventional. When using the preferred synthetic rubbers, this initial mixing can be carried out as low as about 120° F. but preferably at about 200° F. Mixing of the preferred principal binder with the remaining ingredients must be conducted so as not to substantially increase the temperature of the mixture beyond about 120° F. for an extended period of time and, therefore, the preliminary mixture is preferably cooled to room temperature. A temperature range of about 20° C. to about 50° C. is suitable. Mixing under the above temperature limitation is also simplified by first comminuting the preliminary mixture at least to some extent. A Phleiderer mixer has provided successful for this mixing operation when followed by brief milling of the composition. Any portion of any of the ingredients of the composition can be added at either stage of the mixing. For example, all the plasticizer can be added and mixed with the principal binder, or part can be added at each stage. As an illustration, about 80 parts plasticizer can be added for each 20 to 30 parts processing resin in the first stage of the mixing.

From the above point in processing until fusion, the temperature of the composition should not exceed about 120° F. for best results although somewhat higher temperatures can be added. The composition can be sheeted at this point and used after fusion and cooling or even directed to other treatment such as pressing or the like prior to complete solvation and fusion. Most often, however, the composition is comminuted to provide particles for mixing with other particles similarly prepared but of different pigmentation for the purpose of obtaining pleasing decorative effects. Many devices are suitable for comminuting the composition although care must be exercised with respect to temperature. A water-cooled extruder equipped with a slicing device has proved satisfactory. A conventional sheeter-scratcher can also be employed as well as an ordinary dicing machine in conjunction with preliminary sheeting of the composition. Blending of particles is most conveniently accomplished by simple physical mixing in a tumbling device such as a Ransome mixer. The particles can be molded by pressure into any desired shape or coated on a backing. All that is necessary to convert the composition to the final state is to raise the temperature of the composition to a point where solvation and fusion of the dispersed resin takes place. The temperature will depend on the nature of the dispersed resin but should vary from about 250° F. to about 350° F.

Table I contains examples of specific formulations which can be formed into surface coverings.

| Example | Binder | | | | Plasticizer | | Filler | |
|---|---|---|---|---|---|---|---|---|
| | Process Binder | Parts | Principal Binder | Parts | | Parts | | Parts |
| 1 | Copolymer of 65% Butadiene; 35% Acrylonitrile; Mooney Viscosity, 70-95. | 5.4 | Copolymer of 97% vinyl chloride; 3% vinyl acetate; Specific Viscosity,¹ 0.18 to 0.21. | 19.7 | Dioctyl Phthalate | 9.9 | Ground Limestone<br>Asbestos shorts<br>Color pigments<br>Stabilizer | 50<br>5<br>7<br>3 |
| 2 | Copolymer of 58% Butadiene; 42% Acrylonitrile; Mooney Viscosity, 70-95. | 5.4 | Polyvinyl chloride; Specific viscosity,¹ 0.17 to 0.20; Avg. particle size, 5 to 10 microns. | 19.6 | Dioctyl sebacate<br>Alkyd derivative of rosin. | 6.8<br>3.2 | Ground Limestone<br>Clay<br>Color pigments<br>Stabilizer | 28<br>28<br>6<br>3 |
| 3 | Copolymer of 87% Vinyl chloride; 13% Vinyl acetate; Specific Viscosity,¹ 0.088 to 0.093. | 4 | Copolymer of 97% Vinyl chloride; 3% vinyl acetate; Specific Viscosity,¹ 0.18 to 0.21. | 28 | Dioctyl phthalate<br>Alkyd derivative of rosin. | 8.0<br>5.0 | Ground Limestone<br>Color pigment<br>Stabilizer | 47.0<br>5.0<br>3.0 |
| 4 | Copolymer of 65% Butadiene; 35% Acrylonitrile; Mooney Viscosity, 70-95. | 3.4 | Polyvinyl chloride; Specific Viscosity,¹ 0.29-0.31; Avg. particle size, 0.2 to 2.0 microns. | 31 | Adipic acid polyester<br>Dioctyl phthalate<br>Phenoxyethyl oleate | 3.0<br>5.8<br>1.8 | Ground Limestone<br>Color pigment<br>Stabilizer | 47<br>5<br>3 |

¹ Specific viscosity measured in solution containing 0.20 gms. resin in 100 ml. nitrobenzene at 20.0° C.

The following examples are given for purposes of illustration.

*Example 5*

The composition designated as 4 in Table I can be processed in accordance with the invention as follows: all of the ingredients except the principal binder and 60% of the plasticizer are mixed in a hot Banbury mixer at 200° F. to a point where the components are well mixed and free of lumps. The mixing usually requires about ten minutes. The mixture is then dumped into pans and allowed to cool to room temperature. The cooled mixture and the principal binder and the balance of the plasticizer are then mixed in a Phleiderer while maintaining the temperature below 120° F. for approximately ten minutes. The mixture is then calendered on cold rolls, chipped into small pieces and blended with differently colored pieces of similar composition. The blended composition is then passed into a two-roll calender. The carrying roll is maintained at a temperature of approximately 75° F. and rotated at a preferred speed of 40 feet per minute and the lower roll is maintained at 100° F. and rotated at a speed of 20 feet per minute to produce a sheet 0.025 inch thick. Desired shapes are then cut from the sheet and deposited on a moving web with other shapes cut from similar sheets of contrasting design to form a uniform surface. The web is passed through a rotary press to consolidate and unite the sheet and then through an oven maintained at 360° F. to plasticize and fuse the entire binder. The sheet is then passed through a planishing unit for surfacing and smoothing. The sheet can be immediately used as a surface covering in sheet form or it can be cut into conventional sized tiles.

The surface coverings obtained from the compositions set forth above were evaluated in relation to presently available plastic surface coverings of the same thickness on the same type of backing. It was found that the product of the invention had equal or superior resistance to abrasion, was very slightly softer, had improved resistance to water absorption, had equal resistance to alkali, was less stiff, was equally flexible, had substantially the same resistance to staining, had about the same density and gloss, had equal soil resistance, had equal resistance to weathering, and had equal resistance to indentation.

*Examples*

[Parts by weight]

| Materials | 6 | 7 | 8 | 9 | 10 | 11 | 12 |
|---|---|---|---|---|---|---|---|
| Hycar [1] | 169 | 193 | | | 8.4 | | 162 |
| VYHH [2] | | | 254 | 762 | | 100 | 75 |
| Filler | 2,461 | 2,773 | 3,690 | 3,690 | 1,338 | 1,100 | 1,650 |
| Pigment | 333 | 96 | 500 | 500 | 28 | 200 | 210 |
| DOP [3] | 82 | 94 | 123 | 225 | 30 | 361 | 297 |
| G50 [4] | 189 | 216 | 283 | | | | 60 |
| Lecithin | | | | | | 30 | |
| Pycol 70 [5] | 75 | 85 | 112 | 112 | | 30 | 30 |
| Barca 10 [6] | 42 | 48 | 63 | 63 | | 60 | |
| QYNV [7] | 845 | 840 | 1,268 | 760 | 666 | 667 | 516 |
| DOP [3] | 68 | 68 | 408 | 204 | | | |

[1] Copolymer of 65% butadiene and 35% acrylonitrile.
[2] Copolymer of 86% vinyl chloride and 14% vinyl acetate.
[3] Di-2-ethylhexyl phthalate plasticizer.
[4] Adipic acid polyester plasticizer.
[5] Phenoxy ethyl-oleate plasticizer.
[6] Barium-cadmium stabilizer.
[7] Polyvinyl chloride.

In Examples 6 to 12, the dry components listed as group A were blended together and then the plasticizer and stabilizer components of group B were mixed in the dry blend. The temperature of the mixture was raised sufficiently to produce a homogeneous mass when the resin components are completely solvated and/or fused. The components of group C are then added and mixed to form a dispersion of the resin in the homogeneous mass. The temperature during the mixing is maintained low enough (less than 200° F.) to prevent solvation of the dispersed resin. The composition can then be readily sheeted, molded, or otherwise formed at low pressures and subsequently heated to a temperature (250° F.–350° F.) high enough to cause solvation and fusion of the dispersed resin.

Any departure from the above description which conforms to the present invention is intended to be included within the scope of the claims.

What is claimed is:

1. A process for producing a hard, flexible surface covering of uniform composition containing as a binder a fused thermoplastic polymer of ethylenic unsaturated compounds solvated with a plasticizer which comprises admixing a minor portion of said thermoplastic polymer of ethylenic unsaturated compounds with at least a portion of said plasticizer, heating the mixture to fuse and solvate said minor portion of polymer with said plasticizer, cooling the mixture and dispersing the remainder of said polymer in discrete particles throughout the cooled mixture without solvating the remaining portion of polymer with plasticizer, comminuting the resulting composition to form solid granules containing said particles uniformly dispersed therein in said unsolvated state, consolidating said granules to mold them together to form a sheet and heating the sheet to solvate said remaining portion of polymer with plasticizer and fuse the entire composition thereby forming said surface covering.

2. A process for producing a hard, flexible surface covering of uniform composition containing as a binder a fused thermoplastic polymer of ethylenic unsaturated compounds solvated with a plasticizer, which comprises admixing a minor portion of said polymer with at least a portion of said plasticizer, heating the mixture to fuse and solvate said minor portion of polymer with said plasticizer, cooling the mixture, dispersing the remaining portion of said polymer in discrete particles throughout the cooled mixture without solvating said remaining portion of polymer with plasticizer, comminuting the resulting composition to form solid granules containing said particles uniformly dispersed therein in said unsolvated state, mixing the solid granules with similar granules of contrasting coloration, consolidating said mixture of granules to mold them together to form a variegated sheet and heating the variegated sheet to solvate said dispersed polymer with plasticizer and fuse the entire composition thereby forming said surface covering.

3. A process for producing a hard, flexible surface covering of uniform composition containing as a binder a fused thermoplastic polymer of ethylenic unsaturated compounds solvated with a plasticizer, which comprises admixing a minor portion of said polymer with at least a portion of said plasticizer, heating the mixture to fuse and solvate said minor portion of polymer with plasticizer, cooling the mixture, dispersing the remaining portion of said polymer in discrete particles throughout the cooled mixture without solvating said second polymer with plasticizer, comminuting the resulting composition to form solid granules containing said particles uniformly dispersed therein in said unsolvated state, mixing the solid granules with similar granules of contrasting coloration, assembling the mixture of solid granules in a uniform layer on a web, consolidating said layer of granules to form a variegated sheet and heating the variegated sheet to solvate said dispersed polymer with plasticizer and fuse the entire composition thereby forming said surface covering.

4. A process for producing a hard, flexible surface covering of homogeneous composition which comprises admixing an elastomer selected from the group consisting of polymerized chloroprene, copolymers of butadiene and acrylonitrile, copolymers of butadiene and styrene and copolymers of isobutylene and isoprene with plasticizer, heating the mixture to fuse and solvate said elastomer with said plasticizer, cooling the mixture and dispersing discrete particles of a polymer of vinyl chloride throughout the cooled mixture without solvating said polymer with plasticizer, comminuting the thus formed composition to form solid granules containing the particles of polymer of vinyl chloride uniformly dispersed therein in said unsolvated state, consolidating said granules to mold them together to form a sheet and heating the sheet to solvate said dispersed polymer with plasticizer and fuse the entire composition thereby forming said surface covering.

5. The process of claim 4 wherein the composition of said surface covering comprises about 25 to about 80 percent filler and about 20 to about 75 percent plasticizer and polymers, about 5 to about 20 percent of said polymers being said elastomer.

6. A process for producing a hard, flexible surface covering of homogeneous composition which comprises admixing a copolymer of vinyl chloride and vinyl acetate with plasticizer, heating the mixture to fuse and solvate said copolymer with said plasticizer, cooling the mixture and dispersing discrete particles of a polymer of vinyl chloride throughout the cooled mixture without solvating said polymer with plasticizer, comminuting the thus formed composition to form solid granules containing the particles of polymer uniformly dispersed therein in said unsolvated state, consolidating said granules to mold them together to form a sheet and heating the sheet to solvate said dispersed polymer with plasticizer and fuse the entire composition thereby forming said surface covering.

7. The process of claim 6 wherein the composition of said surface covering comprises about 25 to about 80 percent filler and about 20 to about 75 percent plasticizer and polymers, about 5 to about 20 percent of said polymers being said copolymer of vinyl chloride and vinyl acetate.

8. A process for producing a hard flexible surface covering of uniform composition containing about 20 to about 75 percent of a plasticized thermoplastic synthetic resinous material as a binder and about 25 to about 80 percent of a filler which comprises mixing a minor portion of the resinous material in an unplasticized state with plasticizer and the filler, heating the mixture to plasticize and fuse said portion of the resinous material, cooling the mixture to below the temperature at which the remaining portion of the resinous material will plasticize and fuse, dispersing the remaining portion of the binder in discrete unplasticized particles throughout the cooled mixture without plasticizing said remaining portion of resinous material, sheeting the composition to form a thin flexible solid sheet containing the particles uniformly dispersed therein in an unplasticized and unfused state, comminuting the solid sheet, assembling the solid comminuted pieces of sheet uniformly on a web and applying pressure and heat to the pieces to mold them together while plasticizing and fusing the entire binder thereby forming said surface covering.

9. A process for producing a hard flexible surface covering of uniform composition containing about 40 to about 70 percent of a plasticized thermoplastic synthetic resinous material as a binder and about 30 to about 60 percent of a filler which comprises mixing about 5 to about 20 percent of the resinous material in an unplasticized state with plasticizer and the filler, heating the mixture to plasticize and fuse said portion of the resinous material, cooling the mixture to below the temperature at which the remaining portion of the resinous material will plasticize and fuse, dispersing the remaining portion of the binder in discrete unplasticized particles throughout the cooled mixture without plasticizing said remaining portion of resinous material, sheeting the composition to form a thin flexible solid sheet containing the particles uniformly dispersed therein in an unplasticized and unfused state, comminuting the solid sheet, assembling the solid comminuted pieces uniformly on a web and applying pressure and heat to the pieces to mold them together while plasticizing and fusing the entire binder thereby forming said surface covering.

10. A process for producing a hard flexible surface covering of uniform composition containing about 40 to about 70 percent of a plasticized thermoplastic synthetic resinous material as a binder and about 30 to about 60 percent of a filler which comprises mixing a minor portion of the resinous material in an unplasticized state with plasticizer and the filler, heating the mixture to plasticize and fuse said portion of the resinous material, cooling the mixture to below the temperatuure at which the remaining portion of the resinous material will plasticize and fuse, dispersing the remaining portion of the binder which comprises a vinyl resin having a fusion temperature of over 250° F. in discrete unplasticized particles throughout the cooled mixture without plasticizing said remaining portion of resinous material, sheeting the composition at a temperature below about 120° F. to form a thin flexible solid sheet containing the particles dispersed therein in an unplasticized and unfused state, comminuting the solid sheet, assembling the comminuted pieces of sheet uniformly on a web and applying pressure and heat to the pieces to mold them together while plasticizing and fusing the entire binder thereby forming said surface covering.

11. A solid composition capable of being formed into a hard, flexible homogeneous fused composition by the application of heat, which comprises about 25 to about 80 percent filler and about 20 to about 75 percent of a binder comprising plasticizer and a thermoplastic polymer of ethylenic unsaturatd compounds, about 70 to about 95 percent of said polymer binder component is in the of discrete particles unsolvated by the plasticizer uniformly dispersed throughout the composition and about 2 to about 30 percent of said thermoplastic polymer is fused and solvated by the plasticizer and which holds the entire composition in a solid unitary mass of sufficient strength to be molded and formed without causing said discrete particles to be solvated with said plasticizer.

12. A solid composition capable of being formed into a hard, flexible homogeneous fused composition by the application of heat which comprises about 25 to about 80 percent filler and about 20 to about 75 percent of a binder comprising plasticizer and thermoplastic polymers of ethylenic unsaturated compounds, about 80 to about 95 percent o said polymer binder component is in the form of discrete particles unsolvated by the plasticizer uniformly dispersed throughout the composition and about 5 to about 20 percent of said polymer binder component is fused and solvated with plasticizer and which holds the entire composition in a solid unitary mass of sufficient strength to be molded and formed without causing said discrete particles to be solvated by said plasticizer.

13. A solid composition capable of being formed into a hard, flexible homogeneous fused composition by the application of heat which comprises about 25 to about 80 percent filler and about 20 to about 75 percent of a binder comprising plasticizer and thermoplastic polymers of ethylenic unsaturated compounds, about 70 to about 98 percent of said polymer binder component is a polymer of vinyl chloride in the form of discrete particles unsolvated by the plasticizer uniformly dispersed throughout the composition and about 2 to about 30 percent of said polymer binder component is an elastomer selected from the group consisting of polymerized chloroprene, copolymers of butadiene and acrylonitrile, copolymers of butadiene and styrene and copolymers of isobutylene and isoprene, said elastomer being solvated with plasticizer and which holds the entire composition in a solid unitary mass of sufficient strength to be molded and formed without causing said discrete particles to become solvated by said plasticizer.

14. A solid composition capable of being formed into a hard, flexible homogeneous fused composition by the application of heat which comprises about 25 to about 80 percent filler and about 20 to about 75 percent of a binder comprising plasticizer and thermoplastic polymers of ethylenic unsaturated compounds, about 70 to about 98 percent of said polymer binder component is a polymer of vinyl chloride in the form of discrete particles unsolvated by the plasticizer uniformly dispersed throughout the composition and about 2 to about 30 percent of said polymer binder component is a copolymer of vinyl chloride and vinyl acetate, said copolymer being solvated with plasticizer and which holds the entire composition in a solid unitary mass of sufficient strength to be molded and formed without causing said discrete particles to become solvated by said plasticizer.

15. A solid composition capable of being formed into a hard, flexible homogeneous fused composition by the application of heat which comprises about 25 to about 80 percent filler and about 20 to about 75 percent of a binder comprising plasticizer and thermoplastic polymers of ethylenic unsaturated compounds, about 70 to about 98 percent of said polymer binder component is a polymer of vinyl chloride in the form of discrete particles unsolvated by the plasticizer uniformly dispersed throughout the composition and about 2 to about 30 percent of said polymer binder component is a copolymer of butadiene and acrylonitrile, said copolymer being solvated with plasticizer and which holds the entire composition in a solid unitary mass of sufficient strength to be molded and formed without causing said discrete particles to become solvated by said plasticizer.

16. A solid composition capable of being formed into a hard, flexible homogeneous fused composition by the application of heat which comprises about 25 to about 80 percent filler and about 20 to about 75 percent of a binder comprising plasticizer and thermoplastic polymers of ethylenic unsaturated compounds, about 70 to about 98 percent of said polymer binder component is a polymer of vinyl chloride having a viscosity of about 0.17 to about 0.31 and is in the form of discrete particles unsolvated by the plasticizer uniformly dispersed throughout the composition and about 2 to about 30 percent of said polymer binder component is a copolymer of butadiene and acrylonitrile having a Mooney viscosity above 40, said copolymer being solvated with plasticizer and which holds the entire composition in a solid unitary mass of sufficient strength to be molded and formed without causing said discrete particles to become solvated with said plasticizer.

17. A solid composition capable of being formed into a hard, flexible homogeneous fused composition by the application of heat, which comprises an elastomer selected from the group consisting of polymerized chloroprene, copolymers of butadiene and acrylonitrile, copolymers of butadiene and styrene and copolymers of isobutylene and isoprene, solvated with plasticizer and dispersed throughout said solvated elastomer, a polymer of vinyl chloride in the form of discrete particles unsolvated by said plasticizer, said solvated elastomer serving to hold the entire composition in a solid unitary mass of sufficient strength to be molded and formed without causing said discrete particles to be solvated with said plasticizer.

18. A solid composition capable of being formed into a hard, flexible homogeneous fused composition by the application of heat, which comprises a copolymer of vinyl chloride and vinyl acetate solvated with plasticizer and dispersed throughout said solvated copolymer, a polymer of vinyl chloride in the form of discrete particles unsolvated by said plasticizer, said solvated copolymer serving to hold the entire composition in a solid unitary mass of sufficient strength to be molded and formed without causing said discrete particles to be solvated with said plasticizer.

19. A process for producing a readily moldable solid composition which can be converted into a hard, homogeneous composition by the application of heat, which comprises admixing a thermoplastic polymer of ethylenic unsaturated compounds with plasticizer, heating the mixture to fuse and solvate said polymer with at least a portion of said plasticizer, cooling the mixture and dispersing a substantially greater quantity of a second polymer of ethylenic unsaturated compounds in discrete particles throughout the cooled mixture without solvating said second polymer with plasticizer.

20. A process for producing a readily moldable solid composition which can be converted into a hard, homogeneous composition by the application of heat, which comprises admixing an elastomer selected from the group consisting of polymerized chloroprene, copolymers of butadiene and acrylonitrile, copolymers of butadiene and styrene and copolymers of isobutylene and isoprene with plasticizer, heating the mixture to fuse and solvate said elastomer with said plasticizer, cooling the mixture and dispersing discrete particles of a polymer of vinyl chloride throughout the cooled mixture without solvating said polymer of vinyl chloride with plasticizer.

21. The process of claim 20 wherein the composition comprises about 25 to about 80 percent filler and about 20 to about 75 percent plasticizer and polymers, about 5 to about 20 percent of said polymers being said elastomer.

22. A process for producing a readily moldable solid composition which can be converted into a hard, homogeneous composition by the application of heat, which comprises admixing a copolymer of vinyl chloride and vinyl acetate with plasticizer, heating the mixture to fuse and solvate said copolymer with said plasticizer, cooling the mixture and dispersing discrete particles of a polymer of vinyl chloride throughout the cooled mixture without solvating said polymer of vinyl chloride with plasticizer.

23. The process of claim 22 wherein the composition comprises about 25 to about 80 percent filler and about 20 to about 75 percent plasticizer and polymers, about 5 to about 20 percent of said polymers being said copolymer of vinyl chloride and vinyl acetate.

24. A process for producing a readily moldable solid composition which can be converted into a hard, homogeneous composition by the application of heat, comprising about 25 to about 80 percent filler and about 20 to about 75 percent plasticizer, a polymer of vinyl chloride and a copolymer of butadiene and acrylonitrile, about 5 to about 20 percent of said polymers being said copolymer of butadiene and acrylonitrile, which comprises admixing all of said copolymer with plasticizer, heating the mixture to fuse and solvate said copolymer with said plasticizer, cooling the mixture and dispersing said polymer of vinyl chloride in discrete particles throughout the cooled mixture without solvating said vinyl chloride polymer with said plasticizer.

25. A process for producing a readily moldable solid composition which can be converted into a hard, homogeneous composition by the application of heat, comprising about 25 to about 80 percent filler and about 20 to about 75 percent plasticizer, a copolymer of vinyl chloride and vinyl acetate and a copolymer of butadiene and acrylonitrile, about 5 to about 20 percent of said copolymers being said butadiene and acrylonitrile, which comprises admixing all of said copolymers of butadiene and acrylonitrile with plasticizer, heating the mixture to fuse and solvate said copolymer with said plasticizer, cooling the mixture and dispersing said copolymer of vinyl chloride and vinyl acetate in discrete particles through the cooled mixture without solvating said copolymer of vinyl chloride and vinyl acetate with said plasticizer.

26. A process for producing a readily moldable solid composition which can be converted into a hard, homogeneous composition by the application of heat, comprising about 25 to about 80 percent filler and about 20 to about 75 percent plasticizer, a polymer of vinyl chloride and a copolymer of vinyl chloride and vinyl acetate, about 5 to about 20 percent of said polymers being said copolymer of vinyl chloride and vinyl acetate, which comprises admixing all of said copolymer with plasticizer, heating the mixture to fuse and solvate said copolymer with said plasticizer, cooling the mixture and dispersing said polymer of vinyl chloride in discrete particles throughout the cooled mixture without solvating said vinyl chloride polymer with said plasticizer.

No references cited.

UNITED STATES PATENT OFFICE
CERTIFICATE OF CORRECTION

Patent No. 3,015,640                            January 2, 1962

John B. Weaver et al.

It is hereby certified that error appears in the above numbered patent requiring correction and that the said Letters Patent should read as corrected below.

Column 7, line 54, for "provided" read -- proved --; columns 7 and 8, in the table, strike out the heading "Plasticizer Filler" to columns 6 to 9 thereof, and insert instead -- Plasticizer -- as the heading to columns 6 and 7 thereof, and -- Filler -- as the heading to columns 8 and 9 thereof; same table, column 8 thereof, strike out the brackets, three occurrences; column 9, in the table, separate the items in the "Materials" column by the addition of double horizontal lines dividing the items into three groups and by indicating their designation in the left-hand margin, from line 1 to line 4 as group "A", line 5 to line 9 as group "B", and lines 10 and 11 as group "C"; column 11, line 65, for "95 percent of said polymer binder component is in the" read -- 98 percent of said thermoplastic polymer is in the form --; column 14, line 39, for "through" read -- throughout --.

Signed and sealed this 8th day of May 1962.

(SEAL)
Attest:

ERNEST W. SWIDER
Attesting Officer

DAVID L. LADD
Commissioner of Patents